United States Patent [19]

Morino et al.

[11] Patent Number: 4,615,405
[45] Date of Patent: Oct. 7, 1986

[54] FOOD WEIGHT MEASURING DEVICE FOR A COOKING APPLIANCE

[75] Inventors: Taisuke Morino, Osaka; Sakio Hanatani; Mituo Ohuchi, both of Nara, all of Japan

[73] Assignee: Sharp Kabushiki Kaisha, Osaka, Japan

[21] Appl. No.: 724,072

[22] Filed: Apr. 16, 1985

[51] Int. Cl.[4] ............ G01G 3/14; G01G 19/00; G01G 19/52
[52] U.S. Cl. .................... 177/210 C; 177/144; 177/245; 219/10.55 R; 374/14; 73/76
[58] Field of Search ............ 177/144, 210 C, 210 FP, 177/244, 245, 1; 219/10.55 R, 10.55 A, 10.55 M; 73/73, 76; 374/14

[56] References Cited

U.S. PATENT DOCUMENTS

| | | | |
|---|---|---|---|
| 4,051,721 | 10/1977 | Williams | 177/210 C X |
| 4,291,775 | 9/1981 | Collins | 177/1 X |
| 4,308,929 | 1/1982 | Estavoyer | 177/210 C |
| 4,350,859 | 9/1982 | Dudley et al. | 219/10.55 R X |
| 4,390,768 | 6/1983 | Teich et al. | 219/10.55 R X |
| 4,430,541 | 2/1984 | Day, Jr. | 219/10.55 R |
| 4,440,251 | 4/1984 | Kunz | 177/210 C X |
| 4,521,658 | 6/1985 | Wyland et al. | 177/144 X |
| 4,566,804 | 1/1986 | Collins et al. | 374/14 |

Primary Examiner—Joseph W. Hartary
Assistant Examiner—Patrick W. Foster
Attorney, Agent, or Firm—Birch, Stewart, Kolasch & Birch

[57] ABSTRACT

A food weight measuring device comprises a table for carrying a foodstuff, a pivotable electrode plate for receiving the food weight, the pivotable electrode plate being pivotably moved responsive to the food weight, a fixed electrode plate for providing an electrical signal corresponding to the food weight in cooperation with the pivotable electrode plate, and an output circuit responsive to the fixed electrode plate for outputting the electrical signal representative of the food weight.

8 Claims, 3 Drawing Figures

FOOD WEIGHT MEASURING DEVICE FOR A COOKING APPLIANCE

BACKGROUND OF THE INVENTION

The present invention relates to a food weight measuring device and, more particularly, to a food weight measuring device for a cooking appliance such as a microwave oven which can exactly measure the weight of food stored in a heating chamber based on a change in static electric capacity.

In a conventional microwave oven, various techniques have been proposed so that a heating period of the oven is selected depending on the weight of food after the weight of food stored on a turntable in the heating chamber of the microwave oven is measured.

In one example to the weight measuring device functions in such a manner that three support rollers a provided at three positions about the peripheral portion of the turntable and they receive a load applied to the turntable and the weight of the food is detected by changing the power received by the three rollers into a displacement of position. However, in the above measurement, the power received by each of the three supporting rollers, namely, the displacement of the positions, must be concentrated at one point. Therefore, the construction of the food weight measuring device may be complex and a wide spaces for disposing the device is needed. Also, the device may become expensive.

SUMMARY OF THE INVENTION

Accordingly, it is an object of the present invention to provide a food weight measuring device for a cooking appliance which has a simple and compact construction.

It is another object of the present invention to provide a food weight measuring device for a cooking appliance which can exactly measure the weight of the food in a cooking chamber based on a change in static electric capacity.

It is still another object of the present invention to provide a microwave oven of the turntable type which comprises a food weight measuring means for measuring the weight of food placed on a turntable disposed in a heating chamber depending on a change in static electric capacity of a condenser formed between two electrode plates.

Other objects and further scope of applicability of the present invention will become apparent from the detailed description given hereinafter. It should be understood, however, that the detailed description of and specific examples, while indicating preferred embodiments of the invention, are given by way of illustration only, since various changes and modifications within the spirit and scope of the invention will become apparent to those skilled in the art from this detailed description.

To achieve the above objects, according to an embodiment of the present invention, a food weight measuring device comprises a table means for carrying foodstuff, pivotal means for receiving the food weight, the pivotal means being pivotably moved responsive to the food weight, a fixed means for providing an electrical signal corresponding to the food weight in cooperation with the pivotal means, and output means responsive to the fixed means for outputting the electrical signal representative of the food weight.

When the present invention is applied to a microwave oven, the microwave oven comprises a food weight measuring the device for measuring weight of food placed on a turntable rotatably disposed in a heating chamber of the microwave oven, the food weight measuring device comprising a pivotable electrode plate downwardly pressed by a lower end of a turntable shaft via a steel ball, and a fixed electrode plate disposed adjacent to the pivotable electrode plate with a small gap between the two electrode plates. One end of the pivotable electrode plate is connected to a fulcrum pivotably supporting the pivotable electrode plate according to the up/down movement of the turntable shaft while the other end of the pivotable electrode plate is connected to an elastic material, such as a spring for elastically supporting the pivotable electrode plate. The weight of food placed on the turntable can be detected by measuring the variation in the capacity of a condenser formed between the pivotable plate and the fixed electrode plate.

BRIEF DESCRIPTION OF THE DRAWINGS

The present invention will be better understood from the detailed description given hereinbelow and the accompanying drawings which are given by way of illustration only, and thus do not limit the present invention and wherein.

DETAILED DESCRIPTION OF THE INVENTION

Figure 1:
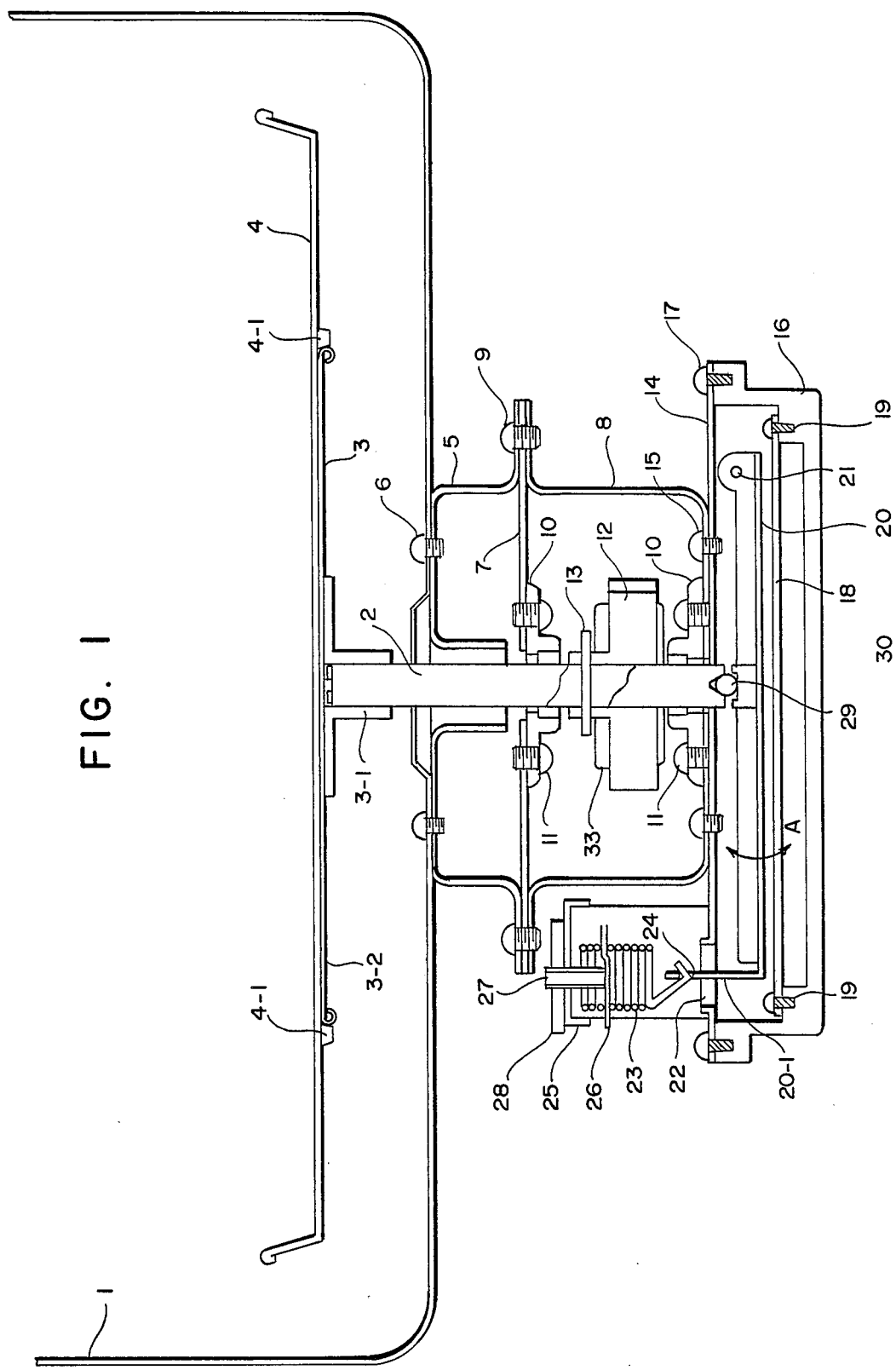
FIG. 1 shows a sectional view of a food weight measuring device disposed in a microwave oven.
Figure 2:
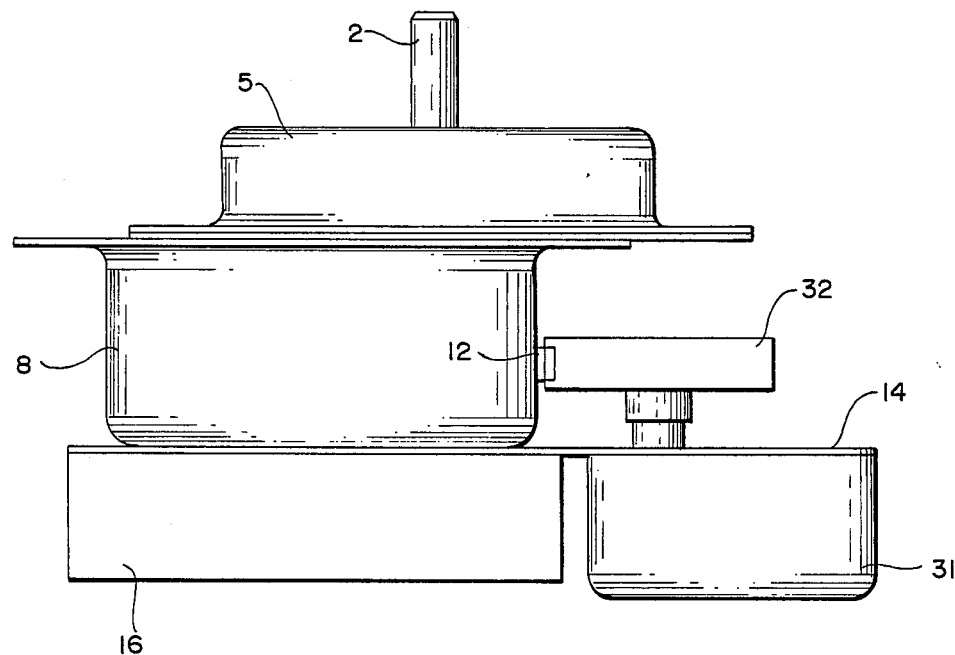
FIG. 2 shows a side view of the food weight measuring device disposed in the microwave oven of FIG. 1.

A food weight measuring device of a preferred embodiment of the present invention applied to a microwave oven of the turntable type will be described with reference to FIGS. 1 and 2. The present invention may be applied to various apparatus including the microwave oven.

A turntable shaft 2 projects from a substantial center portion of a bottom wall of a heating chamber 1 of a mircowave oven. A turntable seat plate 3 is disposed on a top end of the turntable shaft 2. A boss portion 3-1 of the turntable seat plate 3 is suitably engaged by the top end of the turntable shaft 2 with a suitable construction. The engagement between the boss portion 3-1 and the turntable shaft 2 prevents a flange portion 3-2 of the turntable seat plate 3 from shaking in the up/down directions and is easily removable therebetween.

A turntable 4 is carried on the turntable seat plate 3 for carrying food (not shown) to be cooked. Projection portions 4-1 are provided on the rear surface of the turntable 4, and is in contact with a peripheral edge of the turntable seat plate 3 to position the turntable 4.

To prevent leakage of the microwave, a choke member 5 is connected to the bottom plate of the heating chamber 1 by nuts 6. A first bearing supporting member 7 and a second bearing support member 8 are connected to the choke member 5 by nuts 9 to form a choke construction. Bearings 10 are supported by the first bearing support member 7 and the second bearing support member 8, respectively, and are connected to the first bearing support member 7 and the second bearing support member 8 by nuts 11.

The turntable shaft 2 is inserted into the two bearings 10. A turntable gear 12 is disposed in a space between the first bearing support member 7 and the second bearing support member 8. The turntable gear 12 is fixed to the turntable shaft 2 by a pin 13 to present slippage of the gear 12. A chassis 14 is fixed to a rear surface of the second bearing support member 8 by nuts 15.

An electrode casing 16 is connected to the chassis 14 by nuts 17 and is made of an insulative material. A fixed electrode plate 18 is fixed on a horizontal surface of a step portion of the electrode casing 16 by nuts 19. Over the fixed electrode plate 18, a pivotable electrode plate 20 spaced from the fixed electrode plate 18 by predetermined space is pivotably provided in the electrode casing 16. Preferably, the space between the fixed electrode plate 18 and the pivotable electrode plate 20 is approximately about 1 mm. One end of the pivotable electrode plate 20 is pivotably connected to the side wall of the electrode casing 16 by a pin 21, so that the pivotable electrode plate 20 can rotate in the direction of arrow A around the pin 21 (namely, a fulcrum). The free end portion 20-1 of the pivotable electrode plate 20 is bent in an L-shaped form. The vertical portion of the L-shaped end portion of the pivotable electrode plate 20 is inserted thorugh and projects from a hole 22 formed in the end porrtion of the the chassis 14. One end of an elastic member, such as a spring 23, is inserted through a hole 24 formed in the end of the vertical surface of the L-shaped end of the pivotable electrode plate 20. The elastic member is hooked with the L-shaped portion of the pivotable electrode plate 20. The other end of the spring 23 is connected to the spring angle 25 disposed on the chassis 14 by a not 28 via an adjacent plate 26 and an adjacent screw 27. The adjacent plate 26 and the adjacent screw 27 are provided for controlling a spring constant of the spring 23 and the initial space between the pivotable electrode plate 20 and the fixed electrode plate 18, respectively.

A steel ball receiver 30 made of an insulating material is provided at the substantial center portion of the pivotable electrode plate 20 for receiving a steel ball 29. The steel ball 29 is stored in a steel ball storing portion at the lower end of the turntable shaft 2 having a circular, cone-shaped concave. Accordingly, the turntable shaft 2 is "indirectly" connected to the pivotable electrode plate 20 through the steel ball 29.

The turntable shaft 2 can rotate within the bearings 10 in a radical direction against a load (food) applied to the turntable 4, and can rotate by the steel ball 29 stored in the circular-cone shaped concave portion provided at the lower end of the turntable shaft 2 while the shaft is downwardly pressed in a thrust or longitudinal direction.

A motor 31 is disposed on a rear surface of the chassis 14 for driving the turntable shaft 2. A motor gear 32 is connected to the rotating shaft of the motor 31. The motor gear 32 is engaged with the turntable gear 12 through a hole 33 formed in the side wall of bearing plate 8 so that the rotation of the motor 31 is transmitted to the turntable shaft 2.

The fixed electrode plate 18 and the movable electrode plate 20 are made of a metal material, and are insulatively provided within the electrode casing 16 to form one type of air condenser. Lead lines (not shown) are connected to the pivotable electrode plate 20 and the fixed electrode plate 18, respectively. The lead lines are also connected to a resistance externally provided. The electrode plates 18, 20, and the resistance form an oscillator by combining the capacity between the electrode plates 18 and 20 with the resistance. An oscillating frequency from the oscillator is detected so that a frequency corresponding to the weight of food to be cooked disposed on the turntable 4 is obtained. Cooking information such as a heating period is selectively determined based on the output signal depending on the detected frequency. The cooking information may be stored in a read only memory (ROM).

Figure 3:
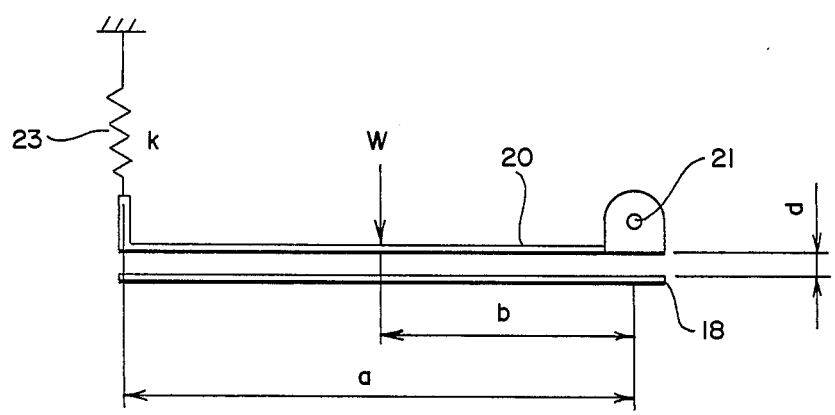
FIG. 3 shows a view for explaining the measuring principle of the food weight measuring device of FIG. 1.

A food weight measuring method will be described with reference to FIG. 3. The letter b designates a radius of the movable electrode plate 20, a designates a diameter of the movable electrode plate 20, d designates a space between the fixed electrode plate 18 and the pivotable electrode plate 20, and k designates an elastic constant of the spring 23.

When a load (namely, food to be cooked) of weight Wg is applied at the substantial center portion of the turntable 4, the turntable shaft 2 is slidably pushed downward while the turntable shaft 2 is supported by the bearings 10, and the force of the weight Wg presses the steel ball receiving portion 30 of the pivotable electrode plate 20 onto the steal ball 29. In this case, the movable electrode plate 20 is moved in the lower direction indicated by the arrow A (FIG. 1) around the pin 21, so that the rotating spring 23 is pulled by a force of $$\frac{b}{a} \cdot W.$$

Depending on the force $$\frac{b}{a} \cdot W,$$

the spring 23 is extended by a length of $$\frac{1}{k} \cdot \frac{b}{a} \cdot W,$$

so that the weight of food on the turntable 4 and the extention of the spring 23 are balanced and the movement of the pivotable electrode plate 20 is stopped.

During this time, the turntable shaft 2 is slidably moved downward in the width direction by an amount of $$\frac{1}{k} \cdot \frac{b^2}{a^2} \cdot W.$$

Depending on the rotation of the pivotable electrode plate 20, the width d between the end of the pivotable electrode plate 20 connected to the spring 23 and the fixed electrode plate 18 is narrowed by the length $$\frac{1}{k} \cdot \frac{b}{a} \cdot W$$

more than the initial width (the initial width is decided when food to be cooked is not disposed on the turntable 2). The space between the end of the pivotable electrode plate 20 connected by the pin 21 and the fixed electrode plate 18 does not change.

Depending on the variation of the width between the electrode plates 18 and 20, the capacity C of the condenser formed between the electrode plates 18 and 20 is changed. If the condenser is connected to a resistance externally provided to form an oscillator with the electrode plates 18 and 20, the oscillator outputs an oscillating frequency of $$f = \frac{1}{C \cdot R}$$

where R designates a resistance value and C designates a capacity of the condenser. Accordingly, the variation of the capacity C reads as the variation of the oscillating frequency, so that an output signal, substantially proportional to the weight W of food to be cooked, can be outputted.

As described above, when the food to be cooked is put on the turntable 4, the weight of the food is measured. Because the output signal according to the weight of food is outputted from the oscillator or a processing circuit, the cooking operation, such as the heating period, the heating temperature, rotating speed of the turntable or the like, are controlled and automatically selected. According to the weight of food, the information of the heating operation is selected from data stored in the memory.

For a defrost mode of frozen food in a conventional oven, the weight of each piece of frozen food must be measured. Further, the weight of the food must be manually inputted by operating keys. Such operation can be eliminated by the present invention.

As described above, the microwave oven of the present invention comprises a food weight measuring device which includes the pivotable electrode plate which is downwardly pressed by the lower end of the turntable shaft rotatably disposed in the heating chamber via the steel ball, and the fixed electrode plate disposed in the neighborhood of the pivotable electrode plate with a narrow gap between the two electrode plates, wherein the end of the pivotable electrode plate is pivotably connected for rotating according to an up/down movement of the turntable shaft while the other end of the pivotable electrode plate is elastically connected to the elastic member such as a spring. Therefore, the weight of food carried on the turntable is measured by measuring the capacity of the condenser formed between the pivotable electrode plate and the fixed electrode plate which varies depending on the weight of the food carried on the turntable. Accordingly, the weight of the food can be automatically measured and the cooking operation determined by translating from the weight to the movement of the turntable shaft. Therefore, a simple and resonable microwave oven can be provided with high quality.

The length of the pivotable electrode plate 20 may be substantially equal to that of the fixed electrode plate 18.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A weight measuring device useful, for example, in a turntable type microwave oven for measuring the weight of food to be cooked thereby determining the necessary cooking information comprising in combination:

a turntable to be rotatably disposed, for example, in a heating chamber of a microwave oven, said turntable including a turntable shaft; and a condenser formed by a pivotal electrode means spaced by a predetermined space from and above a fixed electrode means for producing an electrical signal representative of the weight of said food disposed on said turntable and transmitted to said pivotal electrode means via said shaft causing said pivotal electrode means to be depressed toward said fixed electrode means;

said turntable shaft being indirectly connected to said pivotal electrode means through a bearing means such that rotation of said turntable and turntable shaft is not transmitted to said pivotal electrode means.

2. The weight measuring device of claim 1, wherein said bearing means comprises a steel ball, and further includes an insulative receiver means provided at a substantial center portion of said pivotal electrode means for receiving said steel ball.

3. The food weight measuring device of claim 1, wherein the electrical signal corresponding to the food weight relates to a C, R constant.

4. The weight measuring device of claim 1, further including an output means responsive to said fixed electrode means for outputting said electrical signal.

5. A turntable type microwave comprising:
   a heating chamber; and
   a weight measuring device for measuring the weight of food placed on said turntable for determining cooking information for said food, said device comprising
      a turntable for carrying said food rotatably provided above a bottom wall of said heating chamber inclusive of a turntable shaft which projects downward from said turntable through a substantial center portion of said bottom wall; and
      a condenser formed by a pivotal electrode means spaced by a predetermined space from and above a fixed electrode means for producing an electrical signal representative of the weight of said food disposed on said turntable and transmitted to said pivotal electrode means via said shaft causing said pivotal electrode means to be depressed toward said fixed electrode means;
      said turntable shaft being indirectly connected to said pivotal electrode means through a bearing means such that rotation of said turntable and turntable shaft is not transmitted to said pivotal electrode means.

6. The microwave oven of claim 5, wherein said bearing means of said measuring device comprises a steel ball and said measuring device further includes an insulative receiver means provided at a substantial center portion of said pivotal electrode means for receiving said steel ball.

7. The microwave oven of claim 5, wherein said measuring device further includes an output means responsive to said fixed electrode means for outputting said electrical signal.

8. The microwave ove of claim 5, further including a choke member connected to said bottom wall of said heating chamber.

* * * * *